US008687060B1

(12) United States Patent
Wolff

(10) Patent No.: US 8,687,060 B1
(45) Date of Patent: Apr. 1, 2014

(54) SYSTEM AND METHOD FOR PROVIDING DISTANCE-BASED PULSES RELATIVE TO MOTION OF A SURFACE SCANNED BY A VISION SYSTEM

(75) Inventor: Robert A. Wolff, Sherborn, MA (US)

(73) Assignee: Cognex Corporation, Natick, MA (US)

( * ) Notice: Subject to any disclaimer, the term of this patent is extended or adjusted under 35 U.S.C. 154(b) by 253 days.

(21) Appl. No.: 12/648,060

(22) Filed: Dec. 28, 2009

(51) Int. Cl.
H04N 7/18 (2006.01)
H04N 5/225 (2006.01)
G01C 21/02 (2006.01)
G06F 3/02 (2006.01)

(52) U.S. Cl.
USPC ......... 348/140; 348/169; 250/206.2; 345/169

(58) Field of Classification Search
None
See application file for complete search history.

(56) References Cited

U.S. PATENT DOCUMENTS

| 3,069,654 | A | | 12/1962 | Hough |
| 5,578,813 | A | | 11/1996 | Allen et al. |
| 5,585,619 | A | * | 12/1996 | Goto et al. ................. 250/206.2 |
| 5,644,139 | A | | 7/1997 | Allen et al. |
| 5,786,804 | A | | 7/1998 | Gordon |
| 6,433,780 | B1 | | 8/2002 | Gordon et al. |
| 6,529,850 | B2 | | 3/2003 | Wilborn et al. |
| 6,618,128 | B2 | | 9/2003 | Van Voorhis et al. |
| 6,675,121 | B1 | | 1/2004 | Hardin et al. |
| 6,690,842 | B1 | | 2/2004 | Silver et al. |
| 6,766,038 | B1 | | 7/2004 | Sakuma et al. |
| 7,239,721 | B1 | | 7/2007 | Kumar et al. |
| 7,430,304 | B2 | | 9/2008 | Kikuchj |
| 7,430,305 | B2 | | 9/2008 | Nishiuchi |
| 8,040,321 | B2 | * | 10/2011 | Peng et al. ..................... 345/169 |
| 8,050,891 | B2 | * | 11/2011 | Podoloff et al. ............... 702/191 |
| 2006/0119300 | A1 | * | 6/2006 | Armstrong .................... 318/254 |
| 2008/0100822 | A1 | | 5/2008 | Munro |

OTHER PUBLICATIONS

Silver, "Method for System for Dynamic Feature Detection", Aug. 9, 2008, Published in: US.

* cited by examiner

Primary Examiner — Wen-Tai Lin
(74) Attorney, Agent, or Firm — Loginov & Associates, PLLC

(57) ABSTRACT

This invention provides a system and method for estimating the time of a set of pulses based upon a plurality of position measurements of a moving object provided by a non-contacting sensor, such as a one-dimensional optical sensor that tracks movements of object features and reports position measurements with respect to time. Position measurements determine the estimated velocity. The velocity and position measurement allow the timing of a next pulse to be updated, based upon the time of the previous pulse. The pulse is output at the time of the last updated time before the first new position measurement received after the estimated pulse output time. The system allows pulses to be precisely delivered at predetermined motion distances. Where the distance is too short for the measurement rate, the system compares estimated pulse times to clock-generated pulse times and updates the clock-generated pulse times based upon the difference.

26 Claims, 11 Drawing Sheets

| TIME (μSEC) (T) | POSITION (μM) | VELOCITY ESTIMATE (μM/μSEC) | TARGET PULSE POSITION | SCHEDULED PULSE (μSEC) | PULSE TIME (μSEC) |
|---|---|---|---|---|---|
| 0 | 0 | | 0 | | |
| 200 | 400 | 2.00 | 1000 | 500 | |
| 410 | 827 | 2.01 | 1000 | 496 | 496 |
| 605 | 1200 | 1.99 | 2000 | 1007 | |
| 810 | 1622 | 2.00 | 2000 | 999 | 999 |
| 1014 | 2011 | 1.98 | 3000 | 1513 | |
| 1227 | 2419 | 1.97 | 3000 | 1522 | |
| 1400 | 2796 | 2.01 | 3000 | 1501 | 1501 |
| 1600 | 3200 | 2.01 | 4000 | 1997 | | k=1.000mm

PROVIDED BY SENSOR

FIG. 7

| TIME (µSEC) (T) | POSITION (µM) | VELOCITY ESTIMATE (µM/µSEC) | SCHEDULED PULSE (µSEC) | ACTUAL PULSE OUTPUT TIME (µSEC) |
|---|---|---|---|---|
| *1112*<br>200 | 400 | 2.00 | 500 | 200<br>300<br>400 |
| *1114*<br>410 | 827 | 2.01 | *1142*<br>496 | 496<br>596 |
| 605 | 1200 | 1.99 | 1007 | 702<br>802 |
| 810 | 1622 | 2.00 | 999 | 899<br>999 |
| 1014 | 2011 | 1.98 | 1513 | 1104<br>1204 |
| 1227 | 2419 | 1.97 | 1522 | 1308<br>1408 |
| ⋮ | ⋮ | ⋮ | ⋮ | ⋮ |

FIG. 11

SYSTEM AND METHOD FOR PROVIDING DISTANCE-BASED PULSES RELATIVE TO MOTION OF A SURFACE SCANNED BY A VISION SYSTEM

FIELD OF THE INVENTION

This invention relates to vision systems and more particularly to the use of vision systems to measure relative motion of objects and surfaces.

BACKGROUND OF THE INVENTION

Digital image analysis is used for many practical purposes including, industrial automation, consumer electronics, medical diagnosis, satellite imaging, photographic processing, traffic monitoring, security, etc. In industrial automation, for example, machine vision systems use digital image analysis for automated product inspection, robot guidance, and part identification applications. In consumer electronics, for example, the common optical mouse uses digital image analysis to allow a human to control a cursor on a personal computer screen.

To service these applications, digital images are captured by a sensor, such as an optoelectronic array of photosensitive elements called pixels, and analyzed by a digital information processing device, such as a digital signal processor (DSP) or a general purpose computer executing image analysis software, to extract useful information. One common form of digital image analysis is feature detection. Physical features on objects in the field of view of the sensor (object features) give rise to patterns in the digital images (image features) that can be analyzed to provide information about those object features and the objects that contain them. Exemplary object features can include edges, corners, holes, ridges, and valleys, which give rise to changes in surface depth, orientation, and reflectance. These changes, in turn, interact with illuminating radiation to produce the image features.

Image features can be detected using many well-known methods, for example edge detection, matched filters, connectivity, Hough transforms, and geometric pattern matching. Typically, feature detection in digital image analysis is a static process, by which is meant, generally, that features are detected within a single digital image captured at a particular point in time. Equivalently, to reduce noise, static feature detection can be used on an image that is the average of a plurality of images captured from a stationary scene. In a typical static feature detection system, a one- or two-dimensional digital image of a scene is captured by any suitable mechanism. The image is then analyzed by software implementing a static feature detection technique to identify image features, which comprise a set of attributes that represent measurements of physical properties of corresponding object features. In a two-dimensional (2D) edge detection system, for example, edge attributes can comprise a position, an orientation and a magnitude. The position estimates the location of the edge within the image, and may be determined to sub-pixel precision by well-known mechanisms. The orientation estimates the angle of the edge at the estimated position. The magnitude is an estimate of edge strength, and can be used to provide a measure of confidence that the edge truly corresponds to a physical feature in the field of view and not to some artifact of instrumentation. Typically, an edge is considered to exist only if its magnitude exceeds some value herein called a detection threshold.

In a one-dimensional (1D) edge detection system, for example, position and magnitude can be similarly estimated and generally have the same meaning, but orientation is replaced with polarity, which is a two-state (binary) value that indicates whether the edge is a light-to-dark or dark-to-light transition. There are a large number of well-known static edge detection systems, including those of Sobel and Canny. Another exemplary 2D static edge detection technique is described in U.S. Pat. No. 6,690,842, entitled APPARATUS AND METHOD FOR DETECTION AND SUB-PIXEL LOCATION OF EDGES IN A DIGITAL IMAGE, by William Silver, the teachings of which are hereby incorporated by reference by way of further background. Generally the literature describes two-dimensional methods, with one-dimensional being a special and simpler case. Static edge detection techniques may utilize gradient estimation, peak detection, zero-crossing detection, sub-pixel interpolation, and other techniques that are well known in the art. Another example of static feature detection is the Hough transform, described by way of background in U.S. Pat. No. 3,069,654 entitled METHOD AND MEANS FOR RECOGNIZING COMPLEX PATTERNS, and subsequently generalized by others. For a Hough transform designed to detect lines in a 2D image, for example, the feature attributes might include position and orientation. Yet another example of static feature detection is connectivity analysis, where feature attributes might include center of mass, area, and orientation of the principal axes.

All of the information estimated by a static feature detection technique is limited in accuracy and reliability by the resolution and geometry of the pixel grid. This is because the precise alignment between the pixel grid and the physical features that give rise to image features is essentially an accident of the process by which objects or material are positioned in the field of view at the time that an image is captured. Edge magnitude, for example, varies significantly depending on this accidental alignment, which can result in failing to detect a true edge or falsely detecting an instrumentation artifact. This is particularly likely for edges at the limits of the resolution of the pixel grid-detection of such edges, whether real or artificial, is at the whim of their accidental alignment with the pixel grid. Position estimates are subject to the same whims of accidental alignment. A competent static edge detector can estimate the position of a strong, well-resolved edge to about ¼ pixel, but it is difficult to achieve a significantly better measurement. For weaker or inadequately-resolved edges, the accuracy can be substantially worse.

Static feature detection is used in the common optical mouse to track the motion of the mouse across a work surface. Methods in common use are described in, for example, U.S. Pat. No. 5,578,813, entitled FREEHAND IMAGE SCANNING DEVICE WHICH COMPENSATES FOR NON-LINEAR MOVEMENT, U.S. Pat. No. 5,644,139, entitled NAVIGATION TECHNIQUE FOR DETECTING MOVEMENT OF NAVIGATION SENSORS RELATIVE TO AN OBJECT, U.S. Pat. No. 5,786,804, entitled METHOD AND SYSTEM FOR TRACKING ATTITUDE, and U.S. Pat. No. 6,433,780, entitled SEEING EYE MOUSE FOR A COMPUTER SYSTEM. A reference pattern is stored corresponding to physical features on the work surface, where the reference pattern is a portion of a digital image of the surface. The reference pattern is correlated with subsequent digital images of the surface to estimate motion, typically using sum of absolute differences for the correlation. Once motion exceeding a certain magnitude is detected, a new reference pattern is stored. This is desired because the old reference pattern will soon move out of the field of view of the sensor.

Correlation of this nature is a form of static feature detection. The position of the mouse when a new reference pattern is stored is an accidental alignment of the physical features of the surface with the pixel grid of the sensor, and each time a new reference pattern is stored there will be some error. These errors accumulate proportional to the square root of the number of times a new reference pattern is stored, and quickly become rather large. This is generally not a significant problem for an optical mouse, because a human user serves as feedback loop controlling the motion to achieve a desired effect.

There are a large number of applications for which accurate tracking of the motion of objects or material is of considerable practical value, and where traditional methods of digital image analysis, such as that used in an optical mouse, are inadequate. These applications include numerous examples in industrial manufacturing, including for example the tracking of discrete objects (e.g. a moving line of packages) for control of an ink jet or laser printer, and the tracking of material in a continuous web (for printing and sheet cutting/handling applications, for example). The ability to track the precise motion of a surface with respect to a location is also desirable in the inspection of objects and surfaces (e.g. web inspection) so that a scanning camera, such as a 1D line scan camera can be accurately triggered to acquire images in synchronization with incremental motion of a specific physical distance. It is noted that the incremental motion, in physical units, of an object being viewed by the camera maps to the effective pixel height through the magnification induced by optical elements (e.g. a lens) between the camera sensor and the object. The line scan camera is oriented transverse to the motion direction. Each time an incremental (physical) length of the object passes beneath the line scan camera, the camera is triggered, allowing for acquisition of a continuous, stitched together, image constructed of pixels of predetermined height. Currently, the most commonly used solution is to employ a mechanical encoder attached to a transport drive shaft, but these have many well-known problems including slip between the drive and the material, resulting in inaccuracies.

By way of illustration, FIG. 1 depicts an exemplary inspection system 100 employing a shaft encoder 110 to trigger a line scan camera 120 according to the prior art. The encoder 110 is mechanically attached to a drive roller or other contacting rotating element 112, which can be part of a nip pair 112, 114, or connected to another part of the drive train used for moving an exemplary web in a downstream direction (arrow 132). The shaft encoder can alternatively be an integral component in a drive motor (not shown). Note that while a web 130 is shown as the item to be inspected, this arrangement can apply to any system in which relative motion causes pulses to be generated and employed for a predetermined purpose (e.g. scanning, print registration, etc.). A variety of encoder types can be employed in the depicted arrangement. An incremental encoder provides two quadrature outputs that indicate both the increment of rotational motion and the underlying direction of that rotation, if desired, by determining which of the two outputs is leading. Many encoders also contain an optional reference output that is transmitted each full revolution. A direction/step encoder uses a different signaling convention than a quadrature encoder but provides the same capability of sensing the amount and direction of rotation. Such encoders can also provide an indexing output. There are also absolute encoders that provide an absolute angular position, and other types known to those of ordinary skill.

As shown in FIG. 1, a controller 140 reads the encoder output 142 using a rate converter algorithm 144 appropriate to the output type, and corresponds this signal to the desired image acquisition (line trigger 146) rate in the line scan camera, based upon an estimation of web motion, and triggering one acquisition for each movement that corresponds to a pixel height. The camera 120, thereby acquires a series of 1D images along the image line 150, under illumination 152 that allows images of the surface to be delivered to a frame grabber (or similar processing device) 154 where they are stitched together and processed for information about quality, location, etc. by a commercially available vision system (for example, system 156). Based upon the inspection criteria of the vision system, an output (for example, a detected flaw) can be provided to an interface 158, for use by the system in automated and human-directed processes (for example, stopping the line to correct the flaw).

The above-noted disadvantage of encoder inaccuracy due to slippage and play in the drive mechanism with respect to the driven object is only one of a number of disadvantages encountered with a shaft encoder arrangement. In addition while most shaft encoders may signal a large number of pulses for a given 360-degree rotation, the number is not necessarily sufficient to provide a highly accurate triggering signal for closely spaced image acquisitions. Moreover, the pulses from the encoder may only comprise a rough approximation of the exact distance between required trigger events. For example, an acquisition event may be required every 3.3 pulses, and the 0.3 pulse will require an approximation step that may or may not comport with the actual distance travelled by the inspected surface.

In general, use of a non-contacting distance-sensing technology to track web motion can be advantageous for measuring small movements accurately, as it reads the surface's motion directly and is not affected by drive mechanism slippage and other mechanical concerns. Systems using laser Doppler technology for direct non-contact measurement of surface speed are currently available. However, such systems are generally expensive and bulky in-and-of-themselves. Because these systems require a separate technological platform from that of the underlying vision system, they can render the overall system's costs unacceptable.

Thus, it is desirable to provide a non-contacting system for measuring the distance and velocity of relative motion of a surface with respect to a field of view or other fixed location that is accurate and employs low-cost, readily available components. This system should be capable of replacing a conventional shaft encoder output signal and should provide flexibility with respect to pulse width so that events can be accurately triggered with respect to the surface's motion. This system should integrate with vision systems and provide a small footprint so as to fit in a wide range of existing inspection system locations on, for example, a production line.

SUMMARY OF THE INVENTION

This invention overcomes the disadvantages of the prior art by providing a system and method for outputting a set of pulses based upon a plurality of position measurements of a moving object provided by a non-contacting sensor, such as a one-dimensional optical sensor that tracks movements of object features and reports position measurements with respect to time. The "plurality" of measurements can comprise some or all of the entire available set of measurements. The system and method uses the position measurements to determine the estimated velocity of motion of the object, which is continually updated based upon the present reported position measurement. The velocity and position measurement allow the timing of a next pulse to be updated, based upon the time of the previous transmitted pulse and the current estimate of the position and velocity. The predicted optimum time to output the next pulse may be updated multiple times. In the typical case each estimate is more accurate than the previous one. The pulse is output at the predicted optimum time as most recently estimated. The system allows pulses to be precisely delivered at predetermined motion distances K. The pulse time interval T is equal to the motion distance K divided by the average velocity during the pulse interval V. Where the pulse interval T approaches or is less than the measurement interval, then the system employs a numerically controlled oscillator to compare estimated pulse times to clock-generated pulse times (that can be delivered at a rate more frequent than the measurement rate) and update the clock-generated pulse times based upon the difference. The generated pulse can be delivered in a variety of encoder signal formats and used by a variety of devices to monitor and control operation. In one example, the device is a line scan camera and the pulse acts as a trigger. In this case K is the desired line spacing. For a system that requires square pixels K would be set equal to the line scan effective pixel width (as it maps to the physical distance of the object), but it may also be larger than a pixel width or a fraction thereof. The pulse or trigger signal can be internalized without regard to a particular encoder signal type or format so as to allow capture of images at predetermined intervals—such as in a line scan camera or other vision sensor that combines motion sensing and scanning.

In an illustrative embodiment, a system for generating emulated pulses, which indicate incremental distance travelled (typically in the manner of an encoder), based upon position measurements of a moving object from a non-contacting motion sensor includes a clock that provides a timestamp to each of a plurality (some or all of the set of available measurements) of position measurements received from the non-contacting motion sensor. The system estimates a velocity of the object based upon the plurality of the position measurements with respect to the timestamp of each of the plurality of measurements. If the velocity is less than a predetermined threshold the system operates in "slow" mode. In slow mode a pulse scheduler estimates the time to output a next pulse based upon the estimated velocity and the most recent position measurement. Then, an output process, responsive to the clock, outputs the pulse at a (illustratively) most-updated estimated time to output the pulse. The threshold is set such that at any velocity less than the threshold, the minimum interval required between pulses will be greater than the maximum measurement interval. In an illustrative embodiment, the threshold is set to ½ K/$T_m$, where $T_m$ is the maximum measurement interval. When the velocity is greater than the threshold the velocity and position measurements are used as inputs to control a numerically controlled oscillator which generates pulses at an arbitrary divisor of an internal clock rate. At each position measurement the total accumulated distance moved is compared with the accumulated distance signaled by the pulses from the oscillator and the difference is used to create an error signal. This is used in a feedback control system which tries to drive the error to 0 by varying the numerical oscillator period. This is a variant of the well known phase-locked loop (PLL) control system. The system is operated in a "fast mode" when the velocity exceeds the slow threshold and the control loop is "in lock", as determined by the error signal being below a predetermined error value. In fast mode the numerically controlled oscillator is used to create the output pulses. When not operating in fast mode, the system is considered to be operating in "slow mode." More particularly, in an illustrative embodiment, the oscillator includes (a) a pulse generator responsive to the clock that generates one pulse per N clock ticks, the pulses of the pulse generator being output as the emulated pulses (emulated pulses indicating an incremental distance travelled), (b) a pulse estimation process, responsive to the pulse scheduler that generates an estimated number of pulses, and (c) a difference engine that measures a difference between pulses generated by the pulse generator and pulses generated by the estimation process and thereby provides a rate control value so as to vary N. The difference can be passed through a filter that smoothes the rate control value over a plurality of difference values from the difference engine.

The pulse generation process and oscillator are operatively connected to a device so as to control a motion-dependent device operation. A typical device operation is triggering line scan camera image acquisition.

BRIEF DESCRIPTION OF THE DRAWINGS

The invention description below refers to the accompanying drawings, of which:

FIG. 7 is a chart of an exemplary set of position measurements and the associated pulses generated thereby in the slow mode;

FIG. 11 is a chart of an exemplary set of position measurements and the associated pulses generated thereby in the fast mode.

DETAILED DESCRIPTION

Figure 1:
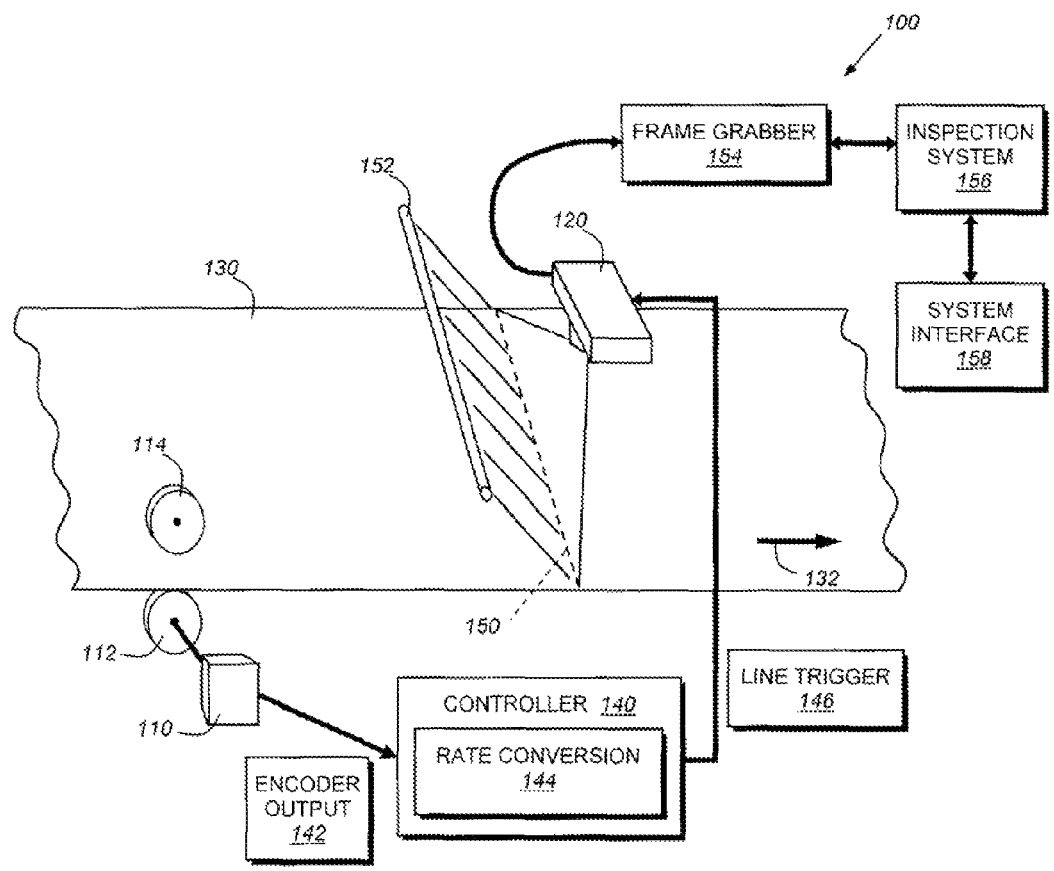
FIG. 1, already described, is a partial perspective view of an exemplary inspection system employing a line scan camera that acquires images based upon the output of a mechanical shaft encoder according to a prior art implementation.

This invention contemplates use of a system to generate motion-based signals in response to the movement of an object relative to a location. Such signals can be used to control various operations including, but not limited to, general reporting of object motion, triggering of a line scan inspection camera, and control of operations such as print registration, web handling, or any other activity that benefits by accurate motion reporting. The illustrative embodiment allows for high accuracy in the prediction of object location and generation of encoder-like pulses to provide motion reporting. The principles herein can be employed with a variety of motion sensing technologies. In an embodiment the system and method herein employs principles of dynamic feature detection that allow the features in moving object to be accurately tracked using, for example, a 1D imaging sensor arrayed along the direction of motion. The tracking of features can be employed to determine the motion velocity and distance travelled by an underlying object. By way of background, the illustrative embodiment refers to commonly assigned U.S. patent application Ser. No. 12/100,100, entitled METHOD AND SYSTEM FOR DYNAMIC FEATURE DETECTION, filed Aug. 9, 2008, by William M. Silver, the teachings of expressly incorporated herein by reference. This reference provides a system and method for dynamic feature detection that substantially reduces the effects of accidental alignment of physical features with the pixel grid of the sensor by using the motion of objects or material in and/or through the sensor's field of view to capture and process a plurality of images that correspond to a plurality of object/ material alignments. Estimates of the position, magnitude, and other attributes of an object feature are based on an analysis of the appearance of the feature as it moves in the field of view and appears at a plurality of pixel grid alignments.

The dynamic feature comprises information that describes and corresponds to a physical feature or characteristic of an object or material (an object feature), wherein the information is determined by analysis of a plurality of images captured during relative movement between the object or material and the field of view. The information comprises at least one measurement of a physical property of the object feature, for example, its position. Individual elements of the information are called attributes or values. In various embodiments using edges for detection purposes, the information may include position, orientation (2D), or illustratively herein, polarity (1D), and magnitude, each similar to but more reliable and accurate than those of conventional static edge detection. Note that opposed to a dynamic feature, a "static feature" refers to an image feature detected by some suitable static feature detection method or system.

In industrial manufacturing, for example, objects and material generally move in a known direction along a production line. The apparent motion of a feature from one image to the next is generally composed of two principal factors: the physical motion of an object or material in the field of view, and instrumentation artifacts such as accidental alignment with the discrete pixel grid, varying illumination and viewing angles, and others known in the art. The physical component of motion is generally substantially common to all features belonging to the same object, whereas the artificial components are generally substantially uncorrelated. The above-incorporated reference provides image analysis systems and methods for estimating the physical component of motion wherein the instrumentation artifacts substantially cancel out, resulting in estimates of the physical motion that are far more accurate than the estimates of attributes, such as position and orientation, of individual static features.

Illustratively, physical motion is described by one or more parameters corresponding to one or more degrees of freedom in which the motion may occur. For example, motion of rigid bodies in a 2D image might be described by three parameters, two of translation and one of rotation. Similarly, motion of a rigid body in a 1D image would be described by one translation parameter. Motion closer to and/or farther away from certain kinds of sensors can be described by a size degree of freedom, since the object would appear larger or smaller as it moved closer or farther. For a 1D sensor of this kind, for example, motion could be described by two parameters, one of translation and one of size. In general many other well-known degrees of freedom can be used as appropriate to the motion in a given application, including, for example, those of the affine and perspective transformations. The set of parameters used to define the degrees of freedom in a particular embodiment are referred to collectively as the pose of the object or material relative to the field of view, or conversely the pose of the field of view relative to the object or material. The pose provides, for each image, a mapping between points on the object and points in the image. Certain kinds of motion, such as for example rotation, suggests the use of 2D images. The above-incorporated reference recognizes, however, that embodiments wherein the motion is suitable for 1D images are of considerable and special practical value, and that 1D digital image analysis has been disfavored relative to 2D devices. Industrial manufacturing is generally characterized by one degree of freedom along a production line, and in part because 1D systems are capable of significantly finer time resolution than 2D systems, the illustrative embodiment employs a 1D sensor to derive motion measurements. These motion measurements not only report movement, but can also report velocity of the object.

Figure 2:
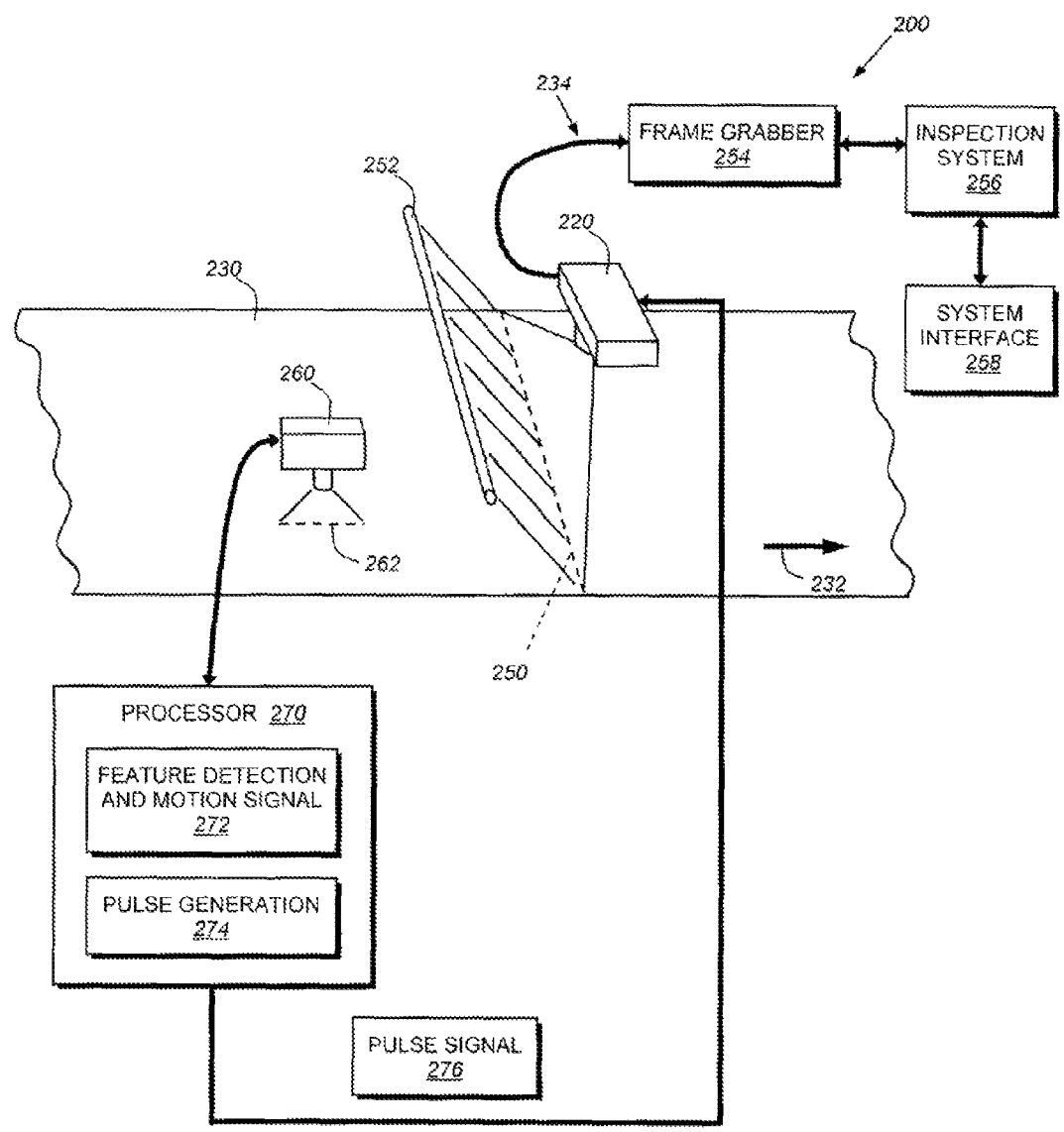
FIG. 2 is a partial perspective view of an inspection system employing a line scan camera that acquires images based upon the output of a system for generating encoder-like signals using a non-contacting sensor according to an illustrative embodiment.

Reference is now made to FIG. 2, which shows an object inspection arrangement 200 according to an embodiment of this invention. In this embodiment a web 230 moves past an inspection station 234 containing a line scan camera 220 in a direction of motion 232. Note, in alternate embodiments, a stream of objects can be conveyed past the station 234. Likewise, the station can be moving while the web or objects is stationary, or both the web/objects and station can be moving. Likewise, the line scan camera is only one possible device employed in an embodiment of this invention. In alternate embodiments, a printing or web-handling device can be employed and/or other functions, such as motion tracking can be supported by the outputs of this embodiment. Briefly, and as described above, the line scan camera 220 of this embodiment, produces a stream of images in response to trigger signals that are captured by a frame grabber 254 and output to an machine vision inspection system 256 that can derive useful information from the stream of images. This information can be displayed or otherwise employed using an interface 258, as described generally above. The triggering of acquisition of each image is timed to correspond to an object motion distance corresponding to one pixel height when the object space is mapped through the optical system of the camera 220 in an exemplary embodiment. The camera's field of view (line 250) is illuminated by an appropriate illuminator. In various embodiments, the illuminator can generate high-angle, low-angle, or both types of illumination, as appropriate to the features being scanned.

For the purposes of this description, the motion of the object over a predetermined incremental physical distance maps to a pixel height. Thus, a motion that generates a "pixel height" is a physical motion sufficient to move a portion of the object a physical distance in the object space that corresponds to a pixel height within the camera's image space. More generally, the pixel height in object space is defined herein by the object's physical speed multiplied by the line capture (scan) interval of the camera. Likewise, the pixel width in the object space is the pixel width in the image space divided by optical system magnification.

In an illustrative embodiment, the arrangement 200 also includes a second sensor 260 that can comprise a line scan camera or similar 1D image acquisition system. The sensor 260 is oriented with a field of view (line 262) generally parallel to the direction of motion (arrow 232). The overall width of the pixel line and number of pixels therein is highly variable. The number of pixels should be sufficient to reveal motion in dynamic features in accordance with the above-incorporated description. The features being detected can be printed information, changes in surface geometry or visible texture (for example, paper fibers). Again, depending upon the nature of features being detected, the illumination (from illuminator 252 or a separate source) is angled appropriately with respect to the web/object surface. Note, while the camera 220 is shown as separate from the camera 260, the two can be combined a one housing and/or employ a single lens structure. For simplicity, two separate housings are shown herein. Likewise, the camera 260 is operatively connected with a processor 270, which can be combined with that of the camera 220 in alternate embodiments. The processor 270 carries out vision system feature detection processes in accordance with an appropriate technique (such as the dynamic feature detection of the above-incorporated description) and generates a movement measurement 272 therefrom. Within the processor 270, or another processing structure, the movement measurement (from block 272) is used to generate (block 274) an accurate emulated shaft encoder signal that can be employed to trigger the inspection camera 220, provide motion information to another function of the manufacturing setup. The signal 276 can be provided in a unique format, or as a conventional quadrature, direction/step and/or other type of encoder signal so that no further modification of the line scan camera 220 is needed.

Figure 3:
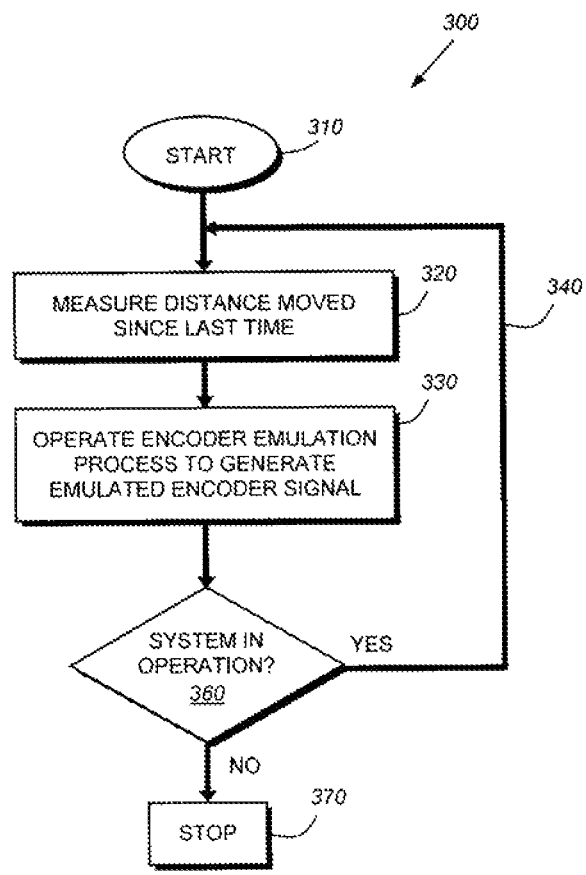
FIG. 3 is a flow diagram showing the operation of a generalized non-contacting motion sensor arrangement that generates position measurements of a moving object for use by the encoder pulse emulation function and process according to illustrative embodiments of the invention.

The generation of emulated encoder signals in accordance with an embodiment of this invention is now described with further reference to FIG. 3, which depicts a basic looping measurement process 300, by which measurements are taken of object motion using, for example, the above-incorporated non-contacting feature detection reference, or another like technique that generates measurements of movement. The process starts either upon intuition of movement or by another motivation in step 310. The process 300, then takes a measurement of web movement since the last time a measurement was taken in step 320. As noted this can occur using a variety of techniques, illustratively utilizing non-contacting, vision-based detection. This measurement is used to operate the encoder emulation process (step 330) which in this embodiment, generates emulated encoder signals within a given hardware device. In alternate embodiments the signals can be delivered via an appropriate communication link to another process or device. The system continues to take and report measurements via steps 320 and 330 (via loop branch 340) while system and/or motion is active (decision step 360). If the system ceases operation or motion ceases, then the system stops taking and reporting measurements as shown (step 370), or otherwise indicates a cessation of motion. As will be described further, the measurement process in an illustrative embodiment typically reports only forward motion of objects (generally in a production line motion direction). Reverse motion can be accounted for in a variety of ways to be described below. Note also that the various processes described herein can be implemented using electronic hardware, software consisting of computer-readable program instructions executing on a computer or processor (general or special purpose) or a combination of such hardware and software. The measurements can be provided at a fixed speed, or illustratively, provided at a speed that is maximized based upon the system's ability to acquire images (used for feature detection, for example) and process the resulting data. For example, the measurements can be taken at approximately 8 KHz, which comports with the acquisition speed of the line scan sensor 260. This rate may be somewhat variable however, where the system is running at or near its maximum rate and delays in processing may variously affect the delivery of information. Alternatively, the rate of operation can be clamped at a reliable lower value. However, a high measurement rate desirably delivers the best system performance over a variety of conditions.

Note that a high measurement speed is not detrimental to system accuracy in accordance with the illustrative embodiment. In general, the accuracy of a single measurement may vary within some limited range. However, the visual tracking of web features ensures that the cumulative accuracy (over a long distance) is the same, regardless of the number of measurements taken. The visual representation of the moving object features remains continuously tied to pixel size and other fixed references (such as static features) within the system.

Figure 4:
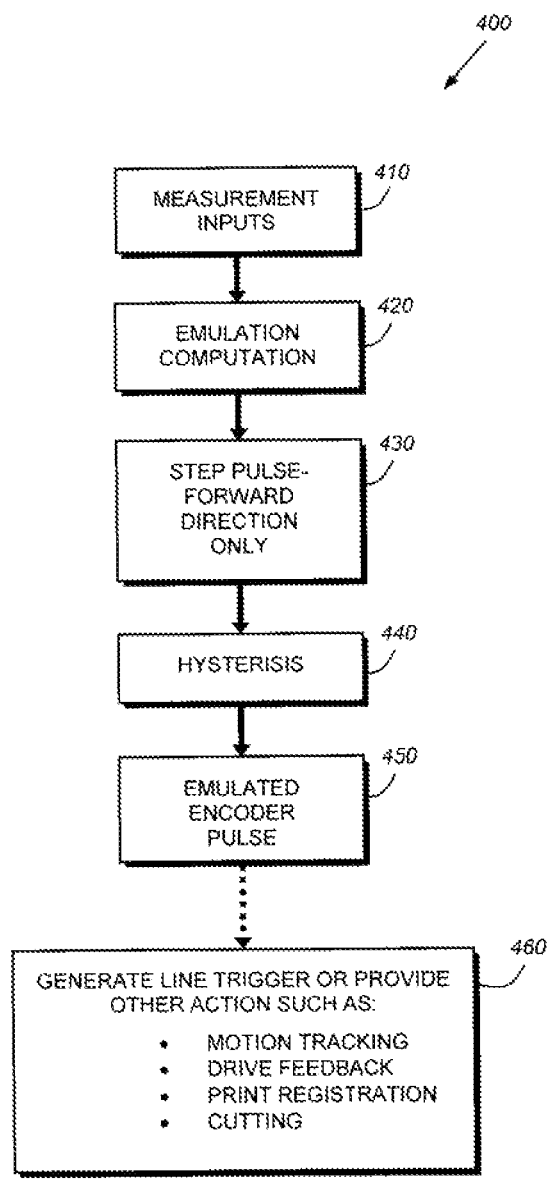
FIG. 4 is a flow diagram of the overall encoder pulse emulation process according to illustrative embodiments of the invention.

The type of encoder signal to be emulated by the process 350 is highly variable. In the illustrative embodiment, a direction/step encoder signal running in a single direction is provided. With reference to FIG. 4 a generalized step pulse generation process 400 is shown for use with various embodiments of the invention. Measurement inputs from the above-incorporated feature detection reference or another non-contact process are provided as they are available (step 410). These measurements are subjected to the emulation computation process (step 420), which is described in detail further below. The emulation computation process delivers the desired step pulse, in the manner of a direction/step encoder (step 430). Notably, this pulse can be tailored to provide an accurate time interval relative to, for example, the physical object distance and corresponding pixel height, so that a line scan camera trigger (line trigger) can occur in synchronization with the movement of a distance increment of the object corresponding to a pixel height. In this manner images acquired by the line scan can be more continuous, with minimal overlap and reduced discontinuity. It is expressly contemplated that other types of encoder signal (such as a step pulse with directional information or a quadrature output can be generated by the emulation process in alternate embodiments. In an embodiment, the step pulse is output only in the forward (e.g. production-line-motion) direction, and no step pulse is output in the reverse direction. This assumes that the system only cares about forward motion. A variety of techniques can be employed to account for reverse motion in alternate embodiments. For example, reverse motion can be stored by the processor (270 in FIG. 2), and pulses are reinitiated only after a given reverse motion has been made up by sufficient, subsequent forward motion.

Because the measurement process (inputs 410) may contain zero-point jitter—particularly when motion is stopped—the forward direction step pulse (430) is subjected to predetermined hysteresis, symbolized by block 440. That is, such jitter can cause the process to mistakenly conclude that forward motion is taking place when the measurement output is only randomly jumping forward and backward a fraction of a millimeter within a fixed range around a stop point. A number of small fractional forward jumps can be mistakenly translated into a slow forward motion increment, thereby causing a false step to be generated when the fractional jumps are aggregated. The hysteresis "filter" acts to prevent generation of a step by summing all measurements over time into a cumulative value. The measurements being summed are internal to the system, which can account for both forward and reverse motion. Hence, the sum of these small forward and reverse measurements is an accurate indicator of whether jitter is occurring. Based upon this sum, no forward initial measurement is outputted (from which pulses are computed) until a predetermined forward accumulated sum is achieved. For example, no forward measurement or pulse occurs until at least 1000 μm of motion has occurred according to the summing process. After accounting for hysteresis, the resulting pulse is output as an emulated encoder signal in step 450. This signal can be used to generate a line trigger or provide other actions (e.g. object-motion reporting, providing feedback to system drive mechanisms/rollers, cutting devices, print registration, etc.) desired by the system as shown by block 460.

Note that the system herein, using a forward direction step pulse arrangement is desirable in instances where the user is concerned mainly with forward motion, such as the scanning of a moving web or object. The system can be adapted to ignore significant reverse movement (for example rethreading or backing-up a web) or where there is no object presence (for example the space between objects being scanned). Thus the hysteresis function and pulse emulation function can be adapted to ignore significant reverse motion and/or "dead space" between motion events.

Figure 5:
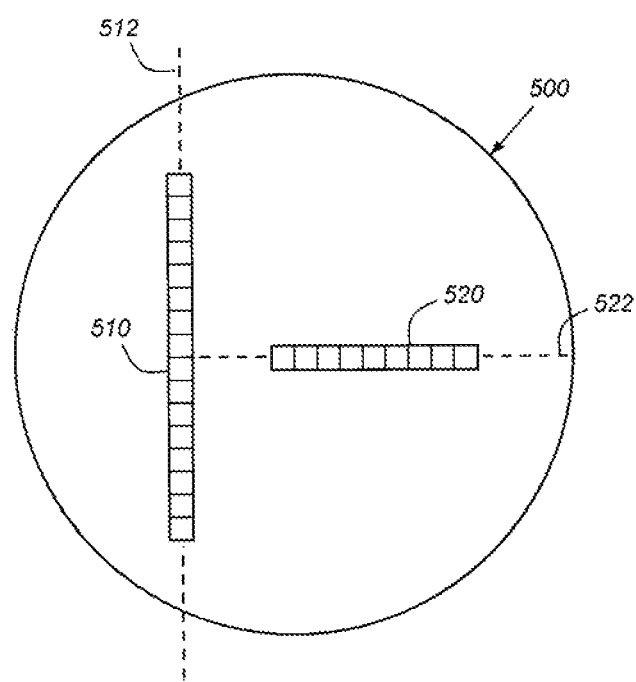
FIG. 5 is a plan view of an optic containing a combination line scan sensor and motion sensor according to an illustrative embodiment.

Note also, where line triggering is the selected function, the use of a line scan sensor and motion line sensor, integrated in the same housing and/or the same optics (e.g. same lens) can be desirable. This is because, when the two sensors are integrated, the relationship between motion sensor pixel size to line scan pixel size is a known and fixed quantity that is constant from camera to camera. One implementation of this arrangement is shown somewhat schematically in FIG. 5. The lens opening or aperture 500 reveals a line scan sensor 510 that extends along a line 512. In setup on a production line, the line 512 is perpendicular to the production line motion direction. A second (shorter in this example), motion sensor 520 is arranged on a line 522 that is perpendicular to line 512 and aligned parallel to the direction of production line motion. In an example, the line scan sensor 510 can have 1000-2000 pixels at a fairly small individual pixel size (for example, 10 μm square), and the motion sensor 520 can have 100-200 pixels and a larger individual pixel size (for example, 50-100 μm square). The resulting calibration constant from which the relationship of motion pixels (and measurements) to line scan pixels is computed as:

CalibrationConstant=MotionSensorPixelSize/LineScanPixelSize

It should be clear that the use of a combined motion sensing and scanning optic can be advantageous, particularly where space on a production line to add separate motion sensing cameras and/or associated illumination is limited.

The operation of the encoder emulation process is now described in further detail with reference to FIG. 6. The emulation process defines multiple modes that depend, in part on the relative speed of the measurements being provided versus the required rate of step signals. By way of introduction, it is assumed that a desired pulse spacing K will produce the needed trigger pulse to provide a trigger every line scan pixel height. For example K can equal 0.01 mm (10 μm) to provide the desired trigger pulse timing. A shaft encoder rarely delivers pulses that line up with the desired K. Thus, a rate converter (block 144 in FIG. 1) is provided in the encoder output stream that produces the appropriate line trigger in response to a predetermined number of pulses from the shaft encoder. As noted above, this conversion can lead to inaccuracies, both due to mechanical imprecision, and estimation errors in the conversion. Note that K, as described herein can be associated with another distance value in addition to those associated with line scan pixel height and line trigger positions/times, such as the precise cut location on a web, a print engine registration value, a step on a drive motor, etc.

In accordance with an illustrative embodiment, the emulation process defines a "slow" mode and a "fast" mode of operation, each of which contain particular computational steps. Slow mode operates generally where the distance between successive measurements is significantly less than K. That is, each of a plurality of measurements are provided to estimate each object distance motion increment corresponding to a pixel height. For example, MeasurementDistance<0.5 K. That is, at least 2 measurements per each corresponding line scan pixel height K are provided (in this case, K being the desired pixel height mapped to object space physical units). This relationship is highly variable. Conversely, for measurement speeds above the predetermined threshold (0.5, for example), the system operates in Fast Mode. A description of slow mode is now provided.

Figure 6:
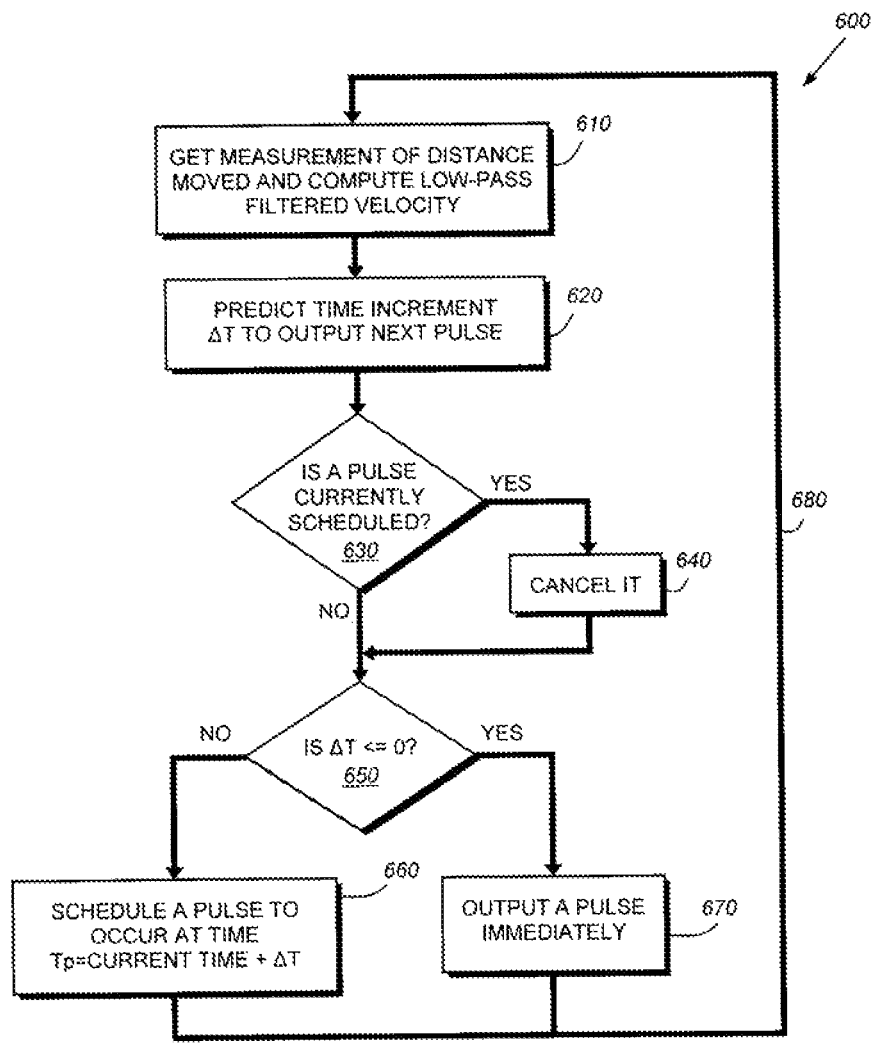
FIG. 6 is a flow diagram showing a pulse generation process based upon input position measurements in a slow mode of operation according to an illustrative embodiment.

According to an illustrative embodiment, and as shown in FIG. 6, during slow mode, the emulation computation process 600 obtains a measurement of distance moved and creates a low-pass filtered speed measurement (velocity) of object motion via the motion sensor output (step 610). The speed measurement is used to predict the time increment to output the next emulated encoder pulse in association with the desired distance K (step 620). In other words, based upon the last actual measurement received, a speed value is estimate for object motion. The system estimates the time to the next encoder pulse based upon the current position and speed. The predicted time interval to the next emulated pulse from the effective time of the most recent position measurement can be characterized as ΔT, providing the following equation:

$$\Delta T = (\text{DesiredPositionOfNextPulse} - \text{Current Position})/\text{Speed}.$$

For example if the reported speed is 100.00 mm/sec, the last emulated pulse was generated at 10.0 mm, and the next emulated pulse is needed at 10.10 mm to satisfy K, and the current measurement indicates 10.03, then the difference is (10.10−10.03) mm, or 0.07 mm, and $$\Delta T = (0.07 \text{ mm})/100.00 \text{ mm/sec} = 0.0007 \text{ sec}$$

Thus, a next emulated pulse should be scheduled in approximately 0.0007 seconds. Thus, if the next position measurement is received before ΔT elapses (and the next emulated pulse is triggered), the process 600 simply cancels the scheduled pulse and reschedules a pulse for the newly computed time (steps 630 and 640). Assuming ΔT is greater than 0 (step 650), then the pulse is triggered at a time in accordance with the new ΔT (step 660). This pulse trigger time is characterized as $T_p$=Current time+ΔT. Note that it is possible for ΔT to be negative (i.e. ΔT<0). In the example above, the pulse has been scheduled for 0.0007 seconds after the measurement, at a predicted position of 10.10 mm. Assuming, by way of example, that that the next measurement occurs 0.00065 seconds later and indicates a position of 10.11 mm. This indicates that the motion has accelerated. Since the position at which the next pulse should be generated (10.10 mm) has already occurred, the next pulse should be generated immediately instead of waiting for the previously scheduled time (step 670). As shown, the process 600 loops back to get the next distance measurement in step 610 via branch 680 while runtime operation continues.

The slow mode process described above can be further illustrated by the exemplary table 700 of FIG. 7. As shown, a column 710 for absolute elapsed time is provided, with entries expressed in microseconds (μsec). An adjacent column 720 is provided for absolute position of the object at the given time, with entries expressed in micrometers (μm). These columns represent the times at which position measurements are provided to the system, and the respective position reported for each measurement. These measurements are provided by the non-contacting motion sensor as described above. By way of example, measurements provided at a rate of approximately 200 μsec per measurement. However, there is some variability on the delivery of each measurement—particularly since the system is operating at a maximum, or nearly maximum, output rate. If, for example, the object moves approximately 2 m/sec (2 μm/μsec), then the exemplary reported positions are incrementing at a rate of approximately 200 μm per measurement. However, there may also be variability in the exact position. Hence it is expected that the values in each column deviate from the precise expected values of 200 per increment. The information of columns 710 and 720 are provided by the motion sensor. Based upon this information the system makes velocity and position estimates.

The present velocity at each reported time is estimated based upon a series of time and position measurements that can be filtered over a second or more. Thus, the column 730, which reports estimated velocity may contain no estimate at time 0, or this can be based upon a default value at which the system is driven (e.g. 2 μm/μsec). Thereafter, velocity can be estimated based upon a plurality of averaged estimates. The averaging technique is highly variable, and can take into account statistical considerations in a manner known to those of ordinary skill. Assuming that K is 1.0 mm or a given fraction thereof, then the process can desire to transmit 1 pulse per mm (see block 718). Note that column 732 shows the target pulse position for each time.

The exemplary method described uses the filtered velocity and the most recent actual measured position to predict the time when a pulse should be scheduled. An alternative implementation might use the filtered velocity and a filtered estimate of position to predict when to schedule the next pulse. A Kalman filter is a possible statistical technique that can be used to generate said estimates. In general, the Kalman filter can be used to estimate both velocity and position, thereby allowing the time to output each next pulse to be determined. Thus, it is expressly contemplated that, for example, the prediction step 620, in the process 600 (FIG. 6) can be implemented using such a Kalman filter or other estimation technique in accordance with ordinary skill. Such techniques use recursive approaches to estimate the correct velocity based on a number of other velocity measurements that are proximate in time to the estimated value.

Column 740 lists each pulse time estimation based upon the computation of ΔT. At the exemplary velocity, a pulse should occur approximately every 500 μsec. As shown, the first pulse time estimation occurs at 200 μsec, and schedules the pulse for precisely 500 μsec (value 732) as both time and velocity (values 712 and 722) equal the precise expected values (200 μsec and 400 μm). However, the next velocity estimation (value 734) taking place at the next measurement, indicates an elevated velocity of 2.01 μm/μsec. This causes the process to update the scheduled pulse time to 496 μsec (value 733). The actual pulse time is indicated in column 750. Since no new measurement occurs before this time (the next measurement occurring at 605 μsec), the pulse is triggered at 496 μsec (block 752 in column 750), in accordance with the updated schedule. The time of the last pulse (block 752) is stored by the process as the last pulse time. The next measurement, where velocity is slightly less than the normal rate of 2.0 μm/μsec, causes the estimate (value 735) of the next pulse time to be at 1007 μsec. The next measurement before the pulse causes an update to the scheduled time to 999 μsec (value 736). The pulse triggers in accordance with the last estimate at 999 μsec (block 754). This time becomes the last pulse time for the process. The next pulse is then scheduled based on the next measurement (box 716) at 1513 μsec (value 737. The schedule updated on new measurements as long as those measurements occur before the current schedule time for the pulse. In this example the third pulse is originally scheduled for 1513 μsec and rescheduled twice, occurring at 1501 μsec (block 756). The creation of pulses in accordance with the exemplary table 700 continues as runtime operation proceeds. A clock circuit (for example a crystal-controlled hardware timer operating at approximately 20 MHz) monitors and correlates the detected time of measurement receipt, pulse scheduling, the time of pulse triggering, and other time based functions to a very high degree of accuracy.

Figure 8:
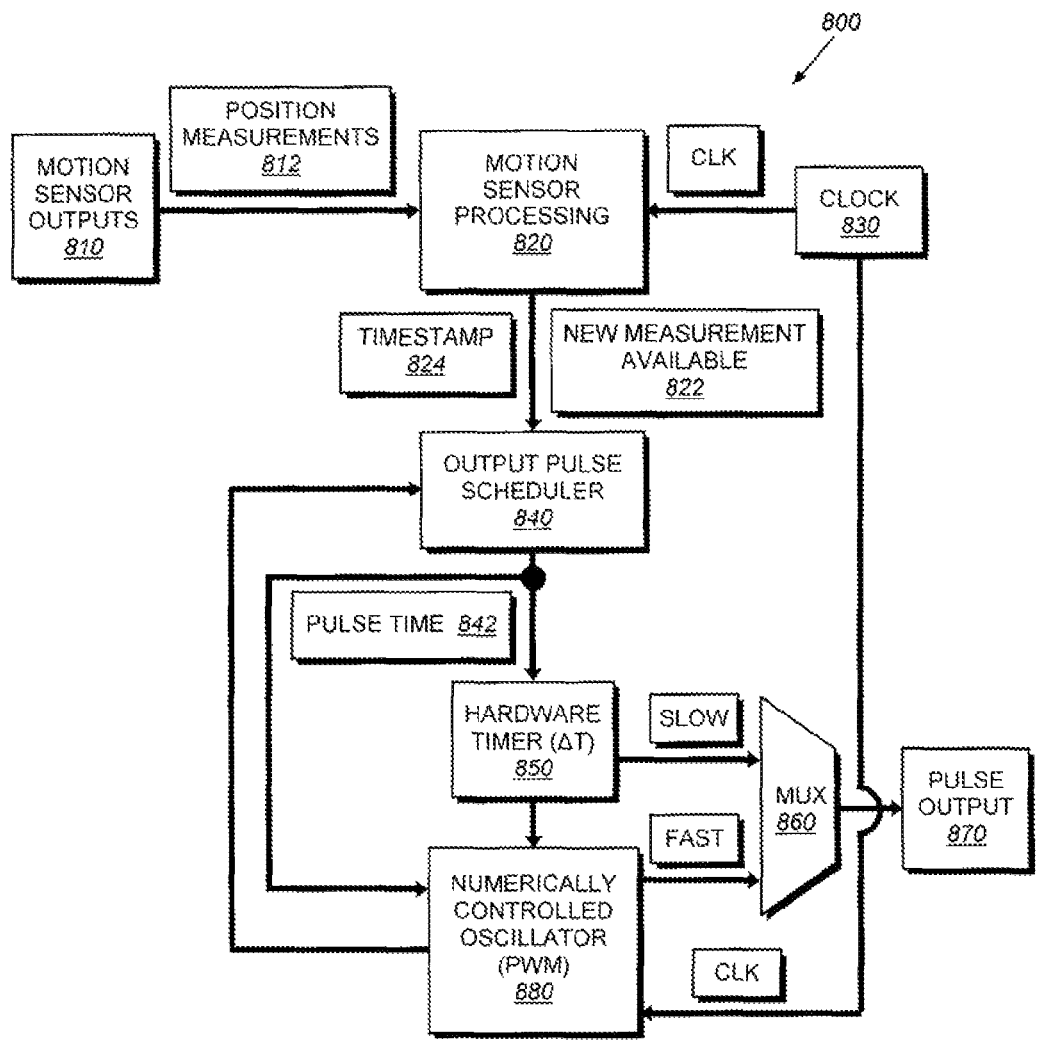
FIG. 8 is a block diagram of the functional elements of the pulse generation system according to an illustrative embodiment showing both slow mode and fast mode elements.

The clock and other functional aspects of the hardware and software arrangement of the illustrative pulse emulation system 800 are shown in further detail in FIG. 8. As shown, the motion sensor system provides outputs 810 in the form of position measurements 812 for use by the motion sensor processing block 820. The measurements are interpreted by the processing block 820 into a form useable by the system. Each position measurement is provided with a time stamp based upon an accurate clock signal CLK input by the accurate crystal-controlled clock/timer circuit 830 as described above. Each new measurement 822 and timestamp 824 is provided to the output pulse scheduler 840 that computes prevailing velocity from a series of stored measurements and that uses the new measurement and timestamp to compute the updated time for triggering the next pulse as described above. This scheduled time 842 is passed to a hardware timer 850 (implementing a counter function) that can employ conventional techniques to generate the pulse signal at the appropriate time based upon control of the clock signal CLK. In the above described slow mode, the pulse is passed through a multiplexer 860, for transmission as the outputted pulse 870, which is used by the line scan camera or other systems to control their operation.

The hardware timer 840 and output pulse scheduler each also deliver their respective output to a numerically controlled oscillator block 880, implemented as a pulse-width modulator (PWM) according to an illustrative embodiment. The clock signal CLK also drives this oscillator 880. The numerically controlled oscillator 880 operates the fast mode, and delivers scheduling times for pulses in accordance therewith.

In general it is desirable to provide an increased pulse rate. As the pulse rate is defined as PulseRate=ObjectVelocity/K, a fast pulse rate for a given ObjectVelocity dictates a smaller K. A smaller K limits the number of measurements that can be made within a given pulse cycle. Fast mode operates when the MeasurementDistance is greater than a predetermined fraction of K. For example, fast mode is employed if MeasurementDistance>0.5K. In further variations, the measurement distance can be greater than K. In such circumstances, an accurate mechanism for updating the pulse schedule should be provided, wherein more than one pulse may be output per measurement cycle. The numerically controlled oscillator 880 provides an equivalent mechanism for generating a multiplicity of pulses within a given measurement cycle.

Figure 9:
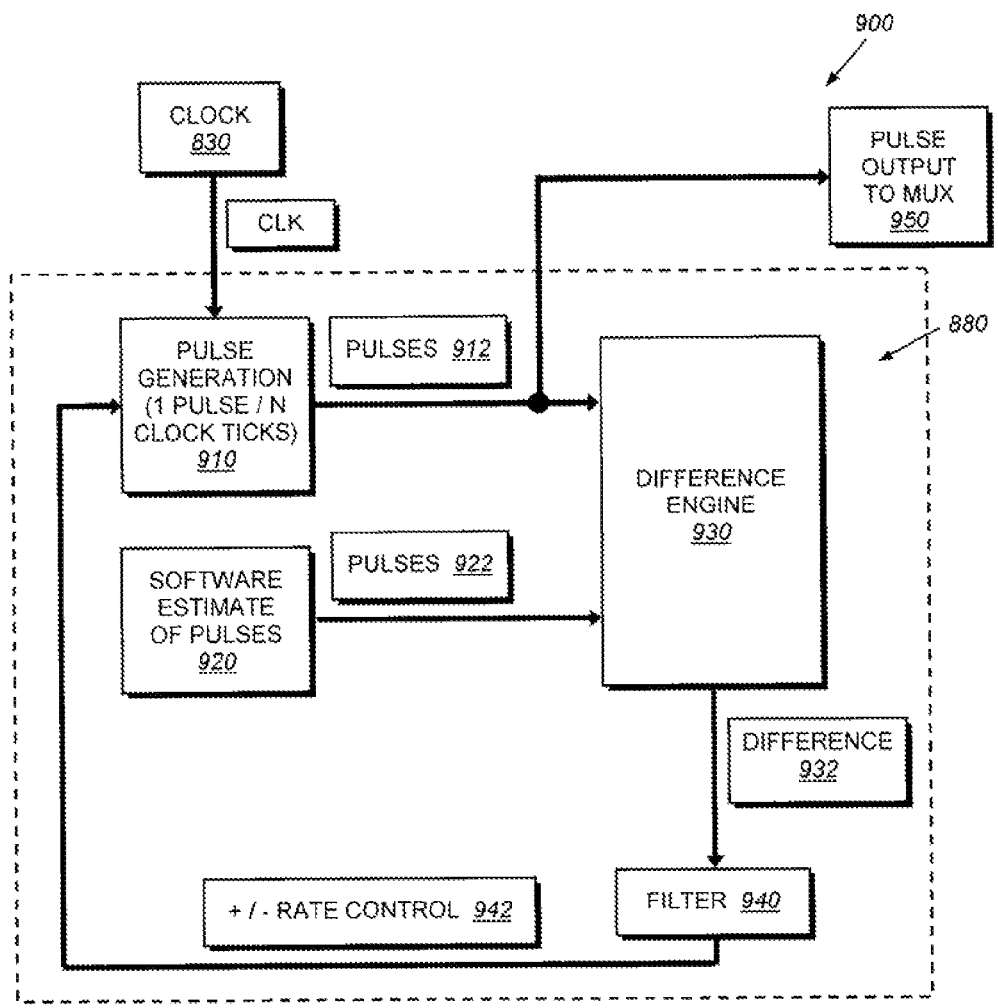
FIG. 9 is a block diagram showing the functional elements of a numerically controlled oscillator of FIG. 8 employed to operate the fast mode according to an illustrative embodiment.

With reference to FIG. 9, an illustrative embodiment of the numerically controlled oscillator 880 for use in the fast mode is shown in further detail. The oscillator circuit 880 is driven by the clock 830 described above, provided with a highspeed, accurate clock signal CLK, that provides "ticks" or edges. The clock signal CLK drives a pulse generation engine 910 that is adapted to generate a pulse 912 for each N clock ticks, where the clock ticks are generated at a substantially higher rate than the measurement rate provided by the motion sensor. Note that N may not equal an integer in certain implementations. A process 920 that provides a software estimate of pulses 922 is also operated. This software estimate of pulses is derived from the measurement-based pulse rate created by the output pulse scheduler 840 and the hardware timer 850. Both the clock-generated pulses 912 and software-estimate pulses 922 are directed to a difference engine 930. The difference 932 output from the difference engine comprises a numerical value that fluctuates continuously. This fluctuating value is passed through a filter 940 that generates a rate control value (up or down (+/−)) 942 in a smooth manner over a longer time interval. This rate control value 942 is used to vary N so that the number of clock ticks used to generate each pulse is correspondingly varied. In this manner a given number of pulses in excess of the measurement rate can be generated through the oscillator's feedback loop, and the pulse rate can smoothly increase of decease based upon the current estimate of pulse rate. The pulse generation process 910, which is driven by the rate control value 942 thereby provides the fast mode pulse signal 950, which is output to the multiplexer 860, and then to the pulse-driven device.

Figure 10:
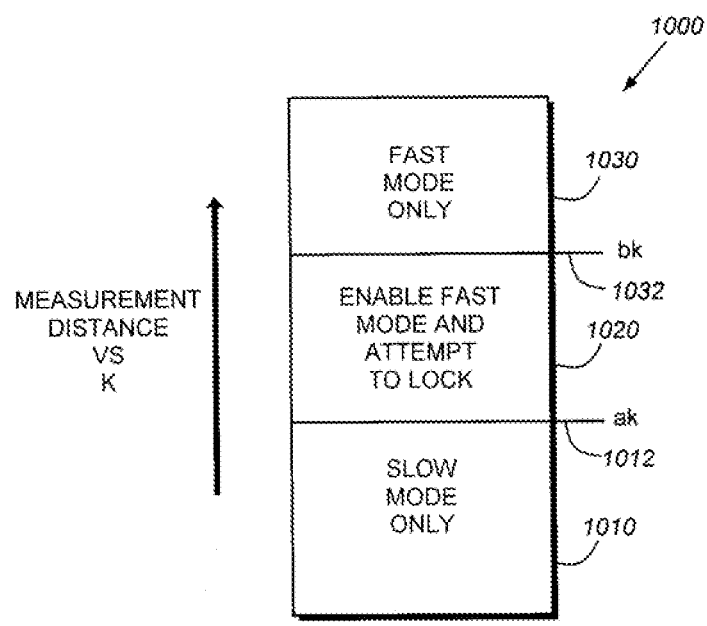
FIG. 10 is a diagram showing the thresholds between operation in slow mode and operation in fast mode according to an illustrative embodiment.

The system's selection of slow mode or fast mode is based upon the prevailing measurement distance with respect to required pulse distance K. With reference to the diagram 1000 of FIG. 10, for a measurement distance less that a predetermined fraction a of K (with, for example, a<0.25-0.5), the system is below a fast mode oscillator (loop) enable threshold 1012, and it operates exclusively in slow mode. This is because below the fraction a, the oscillator's function is not effective and its loop does not retain a lock. Where acceleration occurs and/or the measurement distance is greater than the fraction a, the system enables the oscillator. At this level of measurement distance versus K 1020, slow mode continues to govern pulse generation, but the oscillator loop attempts to retain a lock on pulse generation.

The fast mode and oscillator becomes the exclusive governing pulse generator in a region 1030 where the measurement distance is a fraction b of K (fast mode threshold 1032). This region is such that the slow mode cannot effectively recover from delayed delivery of pulses. It is noted that for short intervals of speed in excess of slow mode's capability, the slow mode can simply generate pulses at a maximum rate until the systems slows to a slower rate, at which tie the slow mode would "catch up" with the required pulses. However, where it is unable to catch up and loses required pulses, then an error occurs. Within the intermediate oscillator enable band 1020, the use of the oscillator loop rather than the slow mode to generate pulses is governed generally by the following general relationship: if pulse rate/measurement distance is greater than a predetermined threshold (for example, a) and the loop error is less than a small value t, then the loop is in lock, and control of pulse generation is governed by fast mode. In general, the loop should come into lock when the slow mode is still running reliably, but the measurement distance is beginning to approach the value K.

The chart 1100 in FIG. 11 is an exemplary illustration of the generation of pulses when the system operates in fast mode. It is assumed that unlike the slow mode chart 700 of FIG. 7, in which measurements are provided approximately 200 μsec apart and a pulse is required approximately every 500 μsec at the given object speed, the chart 1100 represents a requirement of a pulse approximately every 100 μsec (column 1150), while the measurements (column 1110) are delivered once approximately every 200 μsec. Thus, the oscillator loop must generate multiple pulses 1152, 1154, 1156 for each measurement (block 1112) as shown. Position changes (column 1120) and velocity changes (column 1130) result in reestimation of the overall pulse schedule (via slow mode processes) as indicated by column 1140. These estimates drive the timing of the multiple pulses within that measurement cycle. For example, a new estimate 1142 is provided for the next measurement 1114. The rate of the pulses 1160, 1162 is reset by the loop given this updated estimate. A variety of techniques can be employed to estimate the prevailing pulse rate in alternate embodiment. In general, these techniques are adapted to provide a smooth transition for reasonable levels of acceleration and deceleration of the object so that the loop can come into lock.

It is expressly contemplated that a variety of optics and sensor arrangements can be employed to allow a single sensor element to act as both a vision system sensor and a motion sensor in alternate embodiments. Likewise, while the embodiments described herein are directed to the use of a non-contacting motion sensor, it is contemplated that the motion sensor can be a form of contacting sensor. Such implementations can include where higher accuracy is desired than available from the sensor's outputs. In such embodiments, the contacting sensor (such as encoder 112) is interconnected with the processor arrangement of FIG. 2 in place of sensor 260. Likewise, the system can be used where a combination of a contacting and non-contacting sensor is employed, for example to compare the accuracy of each sensor.

It should also be clear that the above-described system and method for emulating pulses from a non-contacting sensor advantageously provides an accurate and flexible pulse signal that can be accurately tailored to the needed pulse distance K. The pulse can be generated in a variety of forms (quadrature, direction/step, forward-only direction/step, etc.) by implementation of appropriate hardware and/or software, allowing it to be used to control and monitor a variety of interconnected devices and processes using a signal native to that device.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, it is expressly contemplated that various software based elements of the system can be implemented as hardware. A hardware engine can be employed to generate pulses. Moreover, a hardware or software engine can be employed to create a quadrature output with appropriate phase-shifted pulse streams from the stream of pulses generated in accordance with the illustrative embodiment. While a line scan camera can operate based upon basic steps, in various embodiments contemplated herein, such as feedback control, the output of a quadrature signal can be desirable. The conversion of step pulses to a quadrature signal mode can be accomplished in a manner clear to those of ordinary skill. Moreover, while interconnections between components and devices are shown as physical or wired connections, it is expressly contemplated that such connections can be wireless in a manner known to those of ordinary skill. Likewise, the arrangement and naming of various system components and processes is merely illustrative, and those functions, process and operations can be combined and organized within different functional blocks and processors in alternate embodiments. More generally, the pulses provided by the pulse generation process and the oscillator can be operatively connected with any device that uses pulses to perform a motion-dependent device operation. One typical motion-dependent operation is the triggering of a line-scan camera based upon line or object motion, but other devices and operations can also be controlled by the pulses emulated herein. Accordingly, this description is meant to be taken only by way of example, and not to otherwise limit the scope of this invention.

What is claimed is:

1. A system for generating emulated pulses that indicate incremental distance travelled comprising:
   a clock that provides a timestamp to each of a plurality of position measurements of a moving object received from a non-contacting motion sensor;
   a pulse scheduler that estimates a velocity of the object based upon the plurality of the position measurements with respect to the timestamp of each of the plurality of measurements, and that updates estimates of a time to output a next pulse based upon the estimated velocity and a reported position of each of the position measurements;
   a numerically controlled oscillator operatively connected to the pulse scheduler, wherein the oscillator includes (a) a pulse generator responsive to the clock that generates 1 pulse per N clock ticks, wherein the pulses of the pulse generator are output as the emulated pulses, (b) a pulse estimation process, responsive to the pulse scheduler that generates an estimated number of pulses, and (c) a difference engine that measures a difference between pulses generated by the pulse generator and pulses generated by the estimation process and thereby provides a rate control value to vary N; and
   an output process responsive to the clock that outputs the pulse at an estimated time to output the pulse.

2. The system as set forth in claim 1 wherein the numerically controlled oscillator generates pulses at times between a time in which each of the plurality of position measurements are received by the pulse scheduler.

3. The system as set forth in claim 2 wherein the oscillator is operated to generate pulses when the estimated velocity exceeds a predetermined threshold and an error in generating pulses from the oscillator is below a predetermined error value.

4. The system as set forth in claim 1 wherein the difference is passed through a filter that smoothes the rate control value over a plurality of difference values from the difference engine.

5. The system as set forth in claim 2 wherein each of the output process and the numerically controlled oscillator include outputs interconnected with a multiplexer that outputs the emulated pulse to a remote device.

6. The system as set forth in claim 5 wherein the output process includes a hardware timer operatively connected to the clock.

7. The system as set forth in claim 5 wherein the pulse defines a direction/step encoder signal.

8. The system, as set forth in claim 7 wherein the direction/step encoder signal exclusively reports forward motion of the object in a single direction.

9. The system as set forth in claim 8 wherein the device is a line scan camera and the direction/step encoder signal is used by the line scan camera as a trigger signal.

10. The system as set forth in claim 2 wherein each of the output process and the numerically controlled oscillator include outputs that are operatively connected to an interface that provides a motion reporting signal with respect to a device.

11. The system as set forth in claim 2 wherein each of the output process and the numerically controlled oscillator include outputs that are operatively connected to a device to perform a motion-dependent device operation.

12. The system as set forth in claim 11 wherein the motion dependent device operation comprises triggering of a line scan camera.

13. The system as set forth in claim 11 wherein the outputs provide an encoder signal adapted to serve an input of the device.

14. The system as set forth in claim 13 wherein the encoder signal comprises at least one of a quadrature encoder signal, a direction/step encoder signal and a direction/step encoder signal reporting exclusively in one direction of motion.

15. The system as set forth in claim 2 wherein the non-contacting motion sensor provides the plurality of position measurements based upon scanning of features of the object with a 1D sensor oriented with respect to a direction of object motion.

16. The system as set forth in claim 1 wherein the output process outputs the pulse at a most updated estimated time to output the pulse.

17. A method for generating emulated pulses that indicate incremental distance travelled comprising the steps of:
   providing a clock, and generating therewith, a timestamp to each of a plurality of position measurements of a moving object received from a non-contacting motion sensor;
   estimating a velocity of the object based upon the plurality of the position measurements with respect to the timestamp of each of the plurality of measurements, and using a filter to determine the updating estimates of a time to output a next pulse based upon the estimated velocity and a reported position of each of the position measurements;
   generating, using a pulse generating, 1 pulse per N clock ticks, wherein the pulses are output as the emulated pulses;
   generating an estimated number of pulses;
   measuring a difference between pulses generated by the pulse generator and the estimated number of pulses and thereby providing a rate control value to vary N; and
   in response to the clock, outputting each pulse at an estimated time to output the pulse.

18. The method as set forth in claim 17 further comprising generating, with a numerically controlled oscillator, pulses at times between a time in which each of the plurality of position measurements are received by a pulse scheduler when a relationship between an object motion distance K at which pulses are required is less than a predetermined value with respect to distances between each of the plurality of position measurements.

19. The method as set forth in claim 17 wherein the step of estimating includes applying a Kalman filter to determine the estimated time to output the next pulse.

20. A system for generating emulated pulses that indicate incremental distance travelled comprising:
   a clock that provides a timestamp to each of a plurality of position measurements of a moving object received from a motion sensor, the motion sensor comprising a non-contact motion sensor that comprises a vision-based sensor that determines movement of the object based upon a texture of the object;

a pulse scheduler that estimates a velocity of the object based upon the plurality of the position measurements with respect to the timestamp of each of the plurality of measurements, and that updates estimates of a time to output a next pulse based upon the estimated velocity and a reported position of each of the position measurements;

a numerically controlled oscillator operatively connected to the pulse scheduler, wherein the oscillator includes (a) a pulse generator responsive to the clock that generates 1 pulse per N clock ticks, wherein the pulses of the pulse generator are output as the emulated pulses, (b) a pulse estimation process, responsive to the pulse scheduler that generates an estimated number of pulses, and (c) a difference engine that measures a difference between pulses generated by the pulse generator and pulses generated by the estimation process and thereby provides a rate control value to vary N; and an output process responsive to the clock that outputs the pulse at an estimated time to output the pulse.

21. The system as set forth in claim 20 wherein the motion sensor comprises a contacting motion sensor and a non-contacting motion sensor.

22. The system as set forth in claim 20 wherein the vision based sensor is integrated within an optic of a line scan camera.

23. The system as set forth in claim 20 wherein the numerically controlled oscillator generates pulses at times between a time in which each of the plurality of position measurements are received by a pulse scheduler.

24. A method for generating emulated pulses that indicate incremental distance travelled comprising the steps of:

providing a clock, and generating therewith, a timestamp to each of a plurality of position measurements of a moving object received from a motion sensor, the motion sensor comprising a non-contact motion sensor that comprises a vision-based sensor that determines movement of the object based upon a texture of the object;

estimating a velocity of the object based upon the plurality of the position measurements with respect to the timestamp of each of the plurality of measurements, and updating estimates of a time to output a next pulse based upon the estimated velocity and a reported position of each of the position measurements;

generating, using a pulse generating, 1 pulse per N clock ticks, wherein the pulses are output as the emulated pulses;

generating an estimated number of pulses;

measuring a difference between pulses generated by the pulse generator and the estimated number of pulses and thereby providing a rate control value to vary N; and in response to the clock, outputting each pulse at an estimated time to output the pulse.

25. The system as set forth in claim 24 wherein the motion sensor comprises a contacting motion sensor and a non-contacting motion sensor.

26. The method as set forth in claim 24 further comprising generating, with a numerically controlled oscillator, pulses at times between a time in which each of the plurality of position measurements are received by a pulse scheduler when a relationship between an object motion distance K at which pulses are required is less than a predetermined value with respect to distances between each of the plurality of position measurements.

* * * * *